Patented Aug. 26, 1947

2,426,224

UNITED STATES PATENT OFFICE 2,426,224

PROCESSES FOR PRODUCING DIBASIC ACIDS AND DERIVATIVES OF DIBASIC ACIDS

Morris S. Kharasch, Chicago, Ill., assignor to Eli Lilly and Company, Indianapolis, Ind., a corporation of Indiana No Drawing. Application September 20, 1943, Serial No. 503,172

3 Claims. (Cl. 260—537)

This invention relates to processes for producing dibasic acids and derivatives of dibasic acids.

Dibasic acids and their derivatives are utilized for a variety of purposes (i. e. resins and high-boiling esters).

The object of this invention is to produce efficiently and economically these dibasic acids and their derivatives, by which term "derivatives" I mean the alkyl esters, acid chlorides and acid fluorides of these dibasic acids.

In accordance with this invention, dibasic acids, their esters, acid chlorides and acid fluorides are produced by reacting acetyl peroxide with an acid, ester, acid chloride or acid fluoride represented by the following formula:

(1) 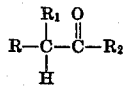

in which R is a member of the class which consists of hydrogen, chlorine, fluorine, and alkyl groups preferably having not more than 3 carbon atoms, $R_1$ is a member of the class which consists of hydrogen, chlorine, fluorine, and alkyl groups preferably having not more than 3 carbon atoms, and $R_2$ is a member of the class which consists of the hydroxyl group, chlorine, fluorine (but not bromine or iodine) and alkoxy groups desirably having primary hydrogen atoms and preferably the methyl group. When R and $R_1$ are halogens, they are the same halogen. Alternatively, the anhydride of the acid included in the structural representation shown in Formula 1 above may be reacted with the acetyl peroxide. The anhydride may be represented by the following formula:

(2) 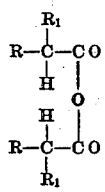

The acetyl peroxide is dissolved in a small quantity of acid, alkyl ester, acid chloride, acid fluoride or anhydride represented by Formula 1 or 2 above. The acid, alkyl ester, acid chloride, acid fluoride or anhydride thus serves as a solvent, and is maintained at a low temperature, preferably about 0° C., to prevent or lessen reaction at this stage, and is substantially free of water. This mixture, or solution, maintained at the low temperature, is then slowly introduced, desirably drop by drop, into a container holding a quantity of the acid, alkyl ester, acid chloride, acid fluoride or anhydride represented by Formula 1 or 2 maintained at a temperature of about 70–100° C. to facilitate reaction. This acid, alkyl ester, acid chloride, acid fluoride or anhydride is also substantially free of water. Since the reaction takes place more rapidly at relatively high temperatures, it is desirable that the quantity of the acid, alkyl ester, acid chloride, acid fluoride or anhydride be maintained at a temperature about 70–100° C. After the addition of the mixture of the acetyl peroxide has been completed, the whole is maintained at a temperature about 85–100° C., until no more acetyl peroxide remains in the mixture. During this time there is formed a dibasic acid or a complex from which a dibasic acid may be isolated. The dibasic acid formed or which may be produced from the complex forms may be represented by the following formula:

(3) 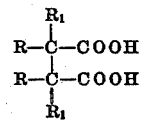

If the acid included in the structure represented by Formula 1 is employed as both the solvent and reactant, the dibasic acid represented by Formula 3 is formed directly and is contained in the reaction mixture; otherwise, a complex is formed which may be converted to the dibasic acid represented by Formula 3 by hydrolysis.

The reaction mixture which contains the dibasic acid or the complex is then distilled to remove the unreacted solvent and volatile reaction products. The residue remaining is treated with an alkali, such as an alkali metal hydroxide or carbonate, and subsequently acidified to obtain the dibasic acid. If the monobasic acid included in the structure represented by Formula 1 is used, the dibasic acid may be obtained directly from the reaction mixture residue by any suitable means, such as the removal of the monobasic acid and crystallization of the residue consisting essentially of the dibasic acid from an appropriate solvent, such as water or alcohol.

Mixtures of the monobasic acid ester, acid chloride, and/or acid fluoride represented by Formula 1 and/or the anhydride represented by Formula 2 may be used instead of the single compounds as the solvent for the acetyl peroxide, and the solution may be added to the same or different mixtures of monobasic acid, acid chloride, acid fluoride and/or anhydride. In this case, a mixture of various dibasic acids or complexes thereof results. Moreover, an inert solvent not affected by the acetyl peroxide may be used as the solvent for the acetyl peroxide, instead of the monobasic acid, ester, acid chloride, acid fluoride, anhydride, or mixtures thereof, and that solution introduced slowly into the appropriate monobasic acid, ester, acid chloride, acid fluoride, anhydride or mixture thereof to form the desired dibasic acid. Alternatively although not desirably because of danger of explosion, solid acetyl peroxide may be added directly to the monobasic acid, ester, acid chloride, acid fluoride or anhydride without preparing a solution of the acetyl peroxide, to produce the desired dibasic acid or derivatives thereof.

The formation of dibasic acids or derivatives thereof in accordance with this invention may be explained in a number of ways. The scheme indicated by the following structural representation appears to account most satisfactorily for the formation of the dibasic acids:

(4) $(CH_3CO)_2O_2 \rightarrow \cdot CH_3 + CH_3COO \cdot + CO_2$
(5) $\cdot CH_3 + CHRR_1COOH \rightarrow complex \rightarrow$
$CH_4 + \cdot CRR_1COOH$

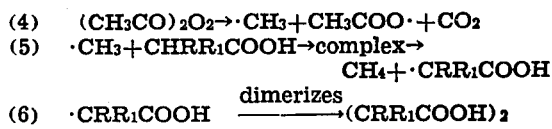

(6) $\cdot CRR_1COOH \xrightarrow{dimerizes} (CRR_1COOH)_2$

In the first step represented by Equation 4, the acetyl peroxide decomposes into the methyl free radical, the acetoxy free radical and carbon dioxide. The methyl free radical is believed to have sufficient energy to remove hydrogen from the alpha-carbon atom of the monobasic acid when that acid is used as the reactant. The quantitative formation of carbon dioxide and methane in the required quantities lends strong support to the reactions outlined in Equations 4 and 5. The dimerization of the free acid-derived radical ($\cdot CRR_1COOH$) might be expected since this radical would probably be stabilized by resonance and would require a high energy of activity to react with the solvent. These properties in a free radical favor dimerization.

The monobasic acid included in the structure represented by Formula 1 decomposes the acetyl peroxide to form the dibasic acid represented by Formula 3, and the dibasic acid may be obtained after removal of the unreacted solvent by crystallization from a suitable solvent or by treating with an alkali, such as sodium hydroxide, and subsequent acidification. Acetyl peroxide reacts with the anhydride represented by Formula 2 to produce a complex which, after removal of the unreacted solvent by distillation, treatment with alkali, isolation of the acidic material and subsequent crystallization from a suitable solvent, yields the dibasic acid represented by Formula 3. Acetyl peroxide reacts with the acid chloride or acid fluoride included in the structure represented by Formula 1 to form a compound which may be hydrolized to form the dibasic acid represented by Formula 3. It may, for example, be treated with an alkali to form a salt of the dibasic acid and the salt may be acidified to yield the dibasic acid.

If the ester included in the structure represented by Formula 1 is reacted with acetyl peroxide, the unreacted ester of the monobasic acid is first removed by distillation and from the residue the desired ester of the higher-boiling dibasic acid is obtained by distillation at low pressures. If substituted esters of the monobasic acid are employed, the substituted esters of the dibasic acid are obtained in a similar manner.

Typical examples of the process in accordance with this invention are:

*Example 1.—Preparation of tetramethyl succinic acid*

Acetyl peroxide is prepared from reagent grade acetic anhydride and sodium peroxide. One mole of the solid peroxide is prepared, is quickly dried in vacuo, then dissolved in 1 or 2 moles of isobutyric acid which is substantially free from water and which is maintained at a temperature below 0° C.

Acetyl peroxide (1 mole) dissolved in the isobutyric acid as heretofore described is siphoned in small quantities into a dropping funnel. The funnel is arranged to introduce the solution of acetyl peroxide into a flask fitted with a reflux condenser and containing 3 to 5 moles of isobutyric acid which is substantially free of water. The solution of acetyl peroxide is introduced below the surface of the isobutyric acid. The isobutyric acid in the flask is maintained at 85–95° C. by external heating on a steam bath. After all the solution of acetyl peroxide has been added, the mixture is maintained at a temperature of 85–95° C. until no more acetyl peroxide is contained in the reaction mixture. During this time tetramethyl succinic acid is formed. Water is detrimental to this reaction and should therefore be excluded at all times from the reaction mixture. The unreacted isobutyric acid and other volatile reaction products are removed by distillation. From the residue, tetramethyl succinic acid may be obtained by crystallization from a suitable solvent such as hot water; or an alkali, such as sodium hydroxide, is added the water solution filtered, and the filtrate evaporated to dryness, to give a solid sodium tetramethyl succinate. This is dissolved in a minimum amount of water and is treated with an acid such as sulphuric acid to yield the solid tetramethyl succinic acid. The tetramethyl succinic acid thus obtained melts at about 191–192° C.

*Example 2.—Preparation of dichlorosuccinic acid*

The procedure outlined in Example 1 is followed except that the acetyl peroxide is dissolved in chloroacetic acid instead of isobutyric acid and the solution containing 1 mole of acetyl peroxide is added to 3 to 5 moles of chloroacetic acid maintained at 85–95° C. The resulting dichlorosuccinic acid is mostly the high melting point variety (M. P. 209–213° C.) and may be isolated as outlined in Example 1. The high melting variety obtained is probably the meso dichlorosuccinic acid.

*Example 3.—Preparation of dimethyl succinic acid*

The procedure outlined in Example 1 is followed except that the acetyl peroxide is dissolved in propionic acid instead of isobutyric acid and the solution containing 1 mole of acetyl peroxide is added to 3 to 5 moles of propionic acid. The resulting product consists of the meso and racemic mixture of the dimethyl succinic acid. The greater portion comprises meso dimethyl succinic acid.

*Example 4.—Preparation of diethyl succinic acid*

The procedure outlined in Example 1 is followed except that the acetyl peroxide is dissolved in n-butyric acid instead of isobutyric acid and the solution containing 1 mole of acetyl peroxide is added to 3 to 5 moles of n-butyric acid. The resulting product consists of the meso and racemic mixture of diethyl succinic acid and is isolated as outlined in Example 1.

Example 5.—Preparation of tetrachloro succinic acid

The procedure outlined in Example 1 is followed except that the acetyl peroxide is dissolved in dichloro acetic acid instead of isobutyric acid and the solution containing 1 mole of acetyl peroxide is added to 3 to 5 moles of dichloro acetic acid. The resulting tetrachloro succinic acid is isolated as outlined in Example 1. The tetrachloro succinic acid, which is a new compound, is extremely hygroscopic and unless freed from all traces of water is a liquid. It is infinitely soluble in water and when treated with silver nitrate in the cold, no precipitate of silver chloride is obtained. However, on heating a precipitate of silver chloride is observed at once. The acid is a much stronger acid than succinic acid and is probably as strong an acid as trichloro acetic acid.

The tetrachloro succinic acid may also be prepared in excellent yields by heating acetyl peroxide (containing a small quantity of ether) with trichloro acetic acid and separating the tetrachloro acetyl chloride by distillation at reduced pressures, hydrolizing the acid chloride with water at room temperature, and removing the water and hydrochloric acid formed in vacuo. The liquid remaining behind is the tetrachloro succinic acid. Upon removing the last traces of water by vacuum sublimation, a solid (extremely hygroscopic) tetrachlorosuccinic acid is obtained. Numerous attempts have been described in the literature to prepare this acid, such as by reacting dichloro fumaric or maleic acid with chlorine, but without avail.

Example 6.—Preparation of succinic acid

The procedure outlined in Example 1 is followed except that the acetyl peroxide is dissolved in glacial acetic acid instead of isobutyric acid and the solution containing 1 mole of acetyl peroxide is added to 3 to 5 moles of glacial acetic acid. The resulting succinic acid may be isolated as outlined in Example 1 or, alternatively, may be extracted from the water solution with ether in a continuous extraction. The yield is substantially quantitative on the basis of the reactions given in Equations 4 to 6.

Example 7.—Preparation of difluorosuccinic acid

The procedure outlined in Example 1 is followed except that the acetyl peroxide is dissolved in fluoroacetic acid instead of isobutyric acid and the solution containing 1 mole of acetyl peroxide is added to 3 to 5 moles of fluoroacetic acid maintained at 85–95° C. In the isolation of the resulting difluoro succinic acid, which is a new compound, great care must be exercised to avoid any contact with water and particularly with water containing an alkali; otherwise the fluorine atoms are removed and acetylene dicarboxylic acid is formed.

Example 8.—Preparation of tetrafluoro succinic acid

The procedure outlined in Example 1 is followed except that the acetyl peroxide is dissolved in difluoroacetic acid instead of isobutyric acid and the solution containing 1 mole of acetyl peroxide is added to 3 to 5 moles of difluoroacetic acid maintained at 85–95° C. The resulting tetrafluoro succinic acid, which is a new compound, may be isolated in the manner described in Example 1.

Example 9.—Preparation of dibasic acids by use of acid anhydrides

The specific dibasic acids prepared in accordance with Examples 1 to 6 may also be produced by the use of the corresponding anhydrides of the monobasic acids employed. For example, to prepare tetramethyl succinic acid, isobutyric anhydride is used instead of isobutyric acid in the procedure outlined in Example 1. In that case, the acetyl peroxide is dissolved in isobutyric anhydride instead of isobutyric acid and the solution containing 1 mole of acetyl peroxide is added to 3 to 5 moles of isobutyric anhydride maintained at 85–95° C.

After the unreacted isobutyric anhydride is removed by distillation from the reaction mixture, the resulting complex contained in the residue is treated with an alkali such as sodium hydroxide to form an alkali salt of tetramethyl succinic acid such as sodium tetramethyl succinate. The tetramethyl succinic acid may be obtained from the salt in the manner described in Example 1.

Example 10.—Preparation of dibasic acids by use of acid chlorides

The specific dibasic acids prepared in accordance with Examples 1 to 6 may also be produced by the use of the corresponding acid chlorides of the monobasic acids employed. For example, to prepare succinic acid, acetyl chloride is used instead of acetic acid in the procedure outlined in Example 6. In that case, the acetyl peroxide is dissolved in acetyl chloride instead of acetic acid and the solution containing 1 mole of acetyl peroxide is added to 3 to 5 moles of acetyl chloride maintained at 85–95° C. The unreacted acetyl chloride and other volatile reaction products are removed by distillation. The succinyl chloride is obtained by distillation in vacuo. Upon hydrolysis with water, the succinic acid is readily obtained in a manner similar to that outlined in Example 1. The dibasic acid chloride may, of course, be used as such for the preparation of other derivatives. The dibasic acids or dibasic acid fluorides may be prepared in like manner by means of the appropriate monobasic acid fluoride instead of the monobasic acid chloride.

Example 11.—Preparation of dibasic acids and esters by use of esters of monobasic acids The specific dibasic acids prepared in accordance with Examples 1 to 6 may also be produced by the use of an ester, such as the methyl ester, of the corresponding monobasic acids employed. For example, to prepare dichloro succinic acid, methyl chloroacetate is used instead of chloroacetic acid in the procedure outlined in Example 2. In that case, the acetyl peroxide is dissolved in methyl chloroacetate instead of chloroacetic acid and the solution containing 1 mole of acetyl peroxide is added to 3 to 5 moles of methyl chloroacetate maintained at 85–95° C. After the unreacted methyl chloroacetate is removed by distillation, the methyl dichloro succinate which is contained in the residue may be purified by any suitable means and used as such or hydrolized to dichloro succinic acid.

What is claimed is:

1. The process of producing a compound selected from the class which consists of dibasic acids and alkyl esters, acid anhydrides, acid chlorides, and acid fluorides thereof, which comprises adding a solution of acetyl peroxide dissolved in a member of the class which consists of the monobasic aliphatic acids represented by the following formula and the alkyl esters, acid anhydrides, acid chlorides and acid fluorides of said acids:

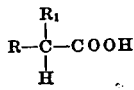

in which R is a member selected from the class which consists of hydrogen, chlorine, fluorine and alkyl groups and $R_1$ is a member selected from the class which consists of hydrogen, chlorine, fluorine and alkyl groups, and in which R and $R_1$ are the same halogen when both of them are halogens, to a member of the class which consists of said monobasic aliphatic acids and the alkyl esters, acid anhydrides, acid chlorides, and acid fluorides of said acids, in the substantial absence of water.

2. The process of producing a dibasic acid in accordance with claim 1, in which the solution of the acetyl peroxide is maintained at a temperature below 0° C. prior to the making of the addition, and the temperature of the member of the class to which the solution is added is maintained above 70° C.

3. The process of producing a compound selected from the class which consists of succinic acids of the following general formula:

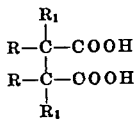

in which R and $R_1$ are both members of the class which consists of hydrogen, chlorine, fluorine, and alkyl groups, and in which R and $R_1$ are the same halogen when both of them are halogens, and alkyl esters, acid anhydrides, acid chlorides, and acid fluorides of such succinic acids, which comprises reacting acetyl peroxide in the substantial absence of water with a member of the class which consists of the monobasic aliphatic acids represented by the following formula:

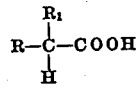

in which R and $R_1$ have the same meaning as above, and the alkyl esters, acid anhydrides, acid chlorides, and acid fluorides of said monobasic aliphatic acids.

MORRIS S. KHARASCH.

REFERENCES CITED

The following references are of record in the file of this patent:

Gelissen et al., Berichte, vol. 58B, pp. 285–94.
Gelissen et al., Berichte, vol. 59B, pp. 63–8.
Meunier, Compt. rend., vol. 206, pp. 677–9.
Price et al., J. Am. Chem. Soc., vol. 64, pp. 1103–6.
Cahen et al., Beilstein Suppl., vol. 2, p. 259.
Gambarjan, Beilstein, 4th ed. 1929, vol. 12, p. 177.
Gambarjan, Beilstein, 4th ed. 1929, vol. 9, p. 180.
Walker, Beilstein, 2d suppl., 4th ed. 1942, vol. 2, p. 174.
Freer et al., Beilstein, 4th ed. 1920, vol. 2, p. 170.
Lippman, Beilstein, 4th ed. 1922, vol. 5, pp. 643, 650.
Walker, Journal Chem. Soc. (London), 1928, pp. 2040–3.
Freer et al., American Chem. Journ., vol. 27, pp. 186–8.
Gelissen et al., Chem. Abst., 1925, vol. 19, p. 1564.
Gelissen et al., Chem. Abst., 1925, vol. 19, p. 1858.
Kharasch et al., Journ. Am. Chem. Soc., 1943, pp. 15–17.